United States Patent
Huang

(10) Patent No.: US 9,488,871 B2
(45) Date of Patent: Nov. 8, 2016

(54) METHOD FOR MANUFACTURING DISPLAY PANEL

(71) Applicant: BOE TECHNOLOGY GROUP CO., LTD., Beijing (CN)

(72) Inventor: Hua Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/378,129

(22) PCT Filed: Dec. 14, 2013

(86) PCT No.: PCT/CN2013/089449
§ 371 (c)(1),
(2) Date: Aug. 12, 2014

(87) PCT Pub. No.: WO2014/194634
PCT Pub. Date: Dec. 11, 2014

(65) Prior Publication Data
US 2015/0309344 A1    Oct. 29, 2015

(30) Foreign Application Priority Data
Jun. 3, 2013    (CN) .......................... 2013 1 0217850

(51) Int. Cl.
*G02F 1/1339*    (2006.01)
*G02F 1/1333*    (2006.01)
*G02F 1/1335*    (2006.01)

(52) U.S. Cl.
CPC ........... *G02F 1/1339* (2013.01); *G02F 1/1333* (2013.01); *G02F 1/133512* (2013.01)

(58) Field of Classification Search
CPC .... G02F 1/1341; G02F 1/1333; G02F 1/161; G02F 1/133351; G02F 1/153; G02F 1/1533; G02F 2001/13415; G02F 2001/1351
See application file for complete search history.

(56) References Cited

U.S. PATENT DOCUMENTS

2003/0147040 A1* 8/2003 Park ...................... G02F 1/1339
349/187
2004/0090586 A1* 5/2004 Choo .................... G02F 1/1339
349/153

(Continued)

FOREIGN PATENT DOCUMENTS

CN    102331637 A    1/2012
CN    102967966 A    3/2013

(Continued)

OTHER PUBLICATIONS

Second Chinese Office Action of Chinese Application No. 201310217850.2, mailed May 6, 2015 with English translation.

(Continued)

*Primary Examiner* — Anne Hines
*Assistant Examiner* — Jose M Diaz
(74) *Attorney, Agent, or Firm* — Collard & Roe, P.C.

(57) ABSTRACT

A method for manufacturing a display panel, the display panel comprising an array substrate (1) and a color filter substrate which are cell assembled, liquid crystals filled between the array substrate (1) and the color filter substrate, which are adhered to each other by a sealant (2), the method comprising: coating the sealant (2) along peripheries of one side of one substrate among the array substrate (1) and the color filter substrate, the side being opposite to the other substrate; forming a light shielding layer (3) in an area encircled by the sealant (2) on a side of the array substrate (1) away from the color filter substrate; irradiating the array substrate provided with the light shielding layer (3) so as to cure the sealant (2); and removing the light shielding layer (3). The method provided by the embodiments of the present disclosure effectively avoids the phenomenon that liquid crystal molecules in an effective display area (4) are damaged by UV light during cell assembling.

20 Claims, 2 Drawing Sheets

(56) References Cited

U.S. PATENT DOCUMENTS

| | | | |
|---|---|---|---|
| 2005/0030471 A1* | 2/2005 | Liou | G02F 1/1343 349/190 |
| 2006/0043318 A1* | 3/2006 | Kodera | G02F 1/1339 250/504 R |
| 2011/0222012 A1* | 9/2011 | Park | G02F 1/133512 349/143 |
| 2013/0078552 A1 | 3/2013 | Lee et al. | |
| 2014/0139798 A1 | 5/2014 | Xu | |
| 2015/0226891 A1* | 8/2015 | Song | G03F 1/58 359/361 |

FOREIGN PATENT DOCUMENTS

| | | |
|---|---|---|
| CN | 103018968 A | 4/2013 |
| CN | 103197472 A | 7/2013 |
| CN | 103293743 A | 9/2013 |
| WO | WO 2014153879 A1 * | 10/2014 |

OTHER PUBLICATIONS

Chinese Office Action of Chinese Application No. 201310217850.2, mailed Feb. 11, 2015 with English translation.

International Search Report, International Preliminary Report on Patentability and Written Opinion of the International Searching Authority of PCT/CN2013/089449 in Chinese, mailed Mar. 20, 2014.

English Translation of the International Search Report of PCT/CN2013/089449 published in English on Dec. 11, 2014.

English translation of the International Preliminary Report on Patentability and Written Opinion of the International Searching Authority of PCT/CN2013/089449, issued Dec. 8, 2015.

* cited by examiner

METHOD FOR MANUFACTURING DISPLAY PANEL

CROSS REFERENCE TO RELATED APPLICATIONS

This application is the National Stage of PCT/CN2013/089449 filed on Dec. 14, 2013, which claims priority under 35 U.S.C. 5119 of Chinese Application No. 201310217850.2 filed on Jun. 3, 2013, the disclosure of which is incorporated by reference.

TECHNICAL FIELD

Embodiments of the present disclosure relate to the liquid crystal display (LCD) manufacturing field, in particular to a method for manufacturing a display panel.

BACKGROUND

With development of the LCD technology, thin-film transistor liquid crystal display (TFT-LCD) prevails in the market for its advantages, such as high quality, low power consumption, non-radiation and the like. An LCD mainly comprises a color filter substrate and an array substrate; liquid crystals are filled between the color filter substrate and the array substrate; and a sealant is adopted to seal peripheries of the liquid crystal display. In the process of manufacturing the LCD, the cell-assembling process of the LCD is an important step in the process of manufacturing the LCD, and comprises: A. coating a sealant on a first glass substrate; B. dripping liquid crystals onto a second glass substrate; C. cell-assembling the first glass substrate and the second glass substrate; and D utilizing ultraviolet (UV) light to cure the sealant after cell assembling. During the processes, viscous sealant is coated on the peripheries of a liquid crystal cell; an array substrate and a color filter substrate can be adhered to each other after the sealant is cured; and the leakage of the liquid crystals filled between the two substrates will not occur.

FIG. 1 is a schematic diagram illustrating the irradiation by UV light in the process to cure a sealant, wherein a mask is used to shield an effective display area from the UV light. However, as the mask is aligned with a low accuracy, it is hard for a horizontal distance d1 between the mask and the sealant to be controlled; an undersize horizontal distance tends to make the mask shield the sealant, and hence the curing of the sealant can be affected; an oversize horizontal distance is likely to have the UV light irradiate liquid crystals in the effective display area within the sealant and hence cause liquid crystal molecules in the effective display area damaged. Moreover, there is a gap d2 between the mask and the array substrate in the vertical direction, such that the UV light can irradiate the liquid crystals in the effective display area within the sealant at certain angles and damage the liquid crystal molecules in the effective display area, and hence the display effect and the yield of the display will be deteriorated. As the requirement on the display devices is getting higher currently and the distance between the sealant and the effective display area of the display is getting narrower and narrower, the phenomenon that the UV light is likely to irradiate the effective display area within the sealant is more and more unacceptable.

SUMMARY

The technical problem to be solved by the embodiment of the present disclosure is to reduce the influence of UV light for curing a sealant on effective display area of a display in the process of manufacturing the display.

In order to settle the technical problem, embodiments of the present disclosure provide a method for manufacturing a display panel. The display panel comprises an array substrate and a color filter substrate which are connected with each other by means of cell assembling. Liquid crystals are filled between the array substrate and the color filter substrate which are connected with each other by a sealant, the method comprises:

coating the sealant to peripheries of one surface of one substrate of the array substrate and the color filter substrate, the surface being opposite to the other substrate;

forming a light shielding layer in an area encircled by the sealant on one surface of the array substrate away from the color filter substrate;

irradiating the array substrate provided with the light shielding layer and curing the sealant; and removing the light shielding layer.

The light shielding layer is configured to shield an area encircled by the sealant from light during the process of irradiating the array substrate.

According to one embodiment of the present disclosure, UV light is used to cure the sealant.

A coverage area of the light shielding layer comprises a first coverage area and a second coverage area, wherein the first coverage area corresponds to an effective display area of the array substrate, and the second coverage area corresponds to an area between the effective display area and the sealant.

The coverage area of the light shielding layer corresponds to an area on the back side of the array substrate between the sealant and an effective display area.

The light shielding layer is made of black positive photoresist, black negative photoresist or an opaque metal material.

The process of forming the light shielding layer includes the following steps:

forming a light shielding film on the back side of the array substrate; and forming a pattern comprising the light shielding layer by means of a patterning process.

According to one embodiment of the present disclosure, the light shielding layer is contiguous to the sealant, or the light shielding layer overlaps the sealant.

In the method for manufacturing the display panel, provided by the present disclosure, in the process of manufacturing the display panel, the light shielding layer is disposed in the area encircled by the sealant on the back side of the array substrate to effectively shield the effective display area from UV light in the process of sealant curing, so that the phenomenon that the liquid crystal molecules in the effective display area are damaged by the UV light can be effectively avoided and the liquid crystal molecules in the effective display area are always kept from being irradiated in the process of sealant curing, and hence the display effect and the yield of the display panel can be improved and the narrow-frame design of the display can be favorably achieved.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

First Embodiment

Figure 2:
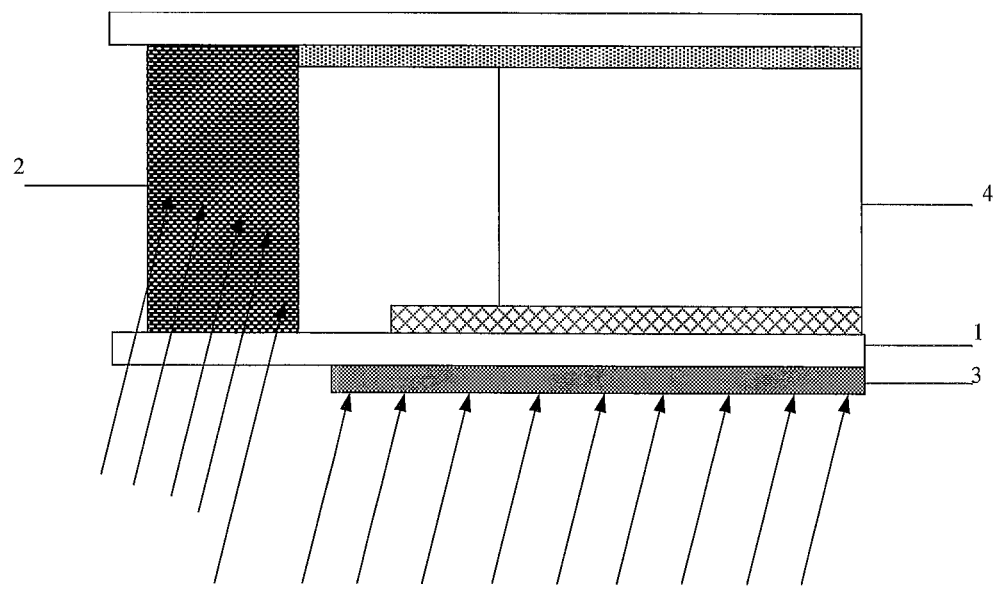
FIG. 2 is a schematic view illustrating curing sealant in one embodiment of the present disclosure.

A first embodiment of the present disclosure provides a method for manufacturing a display panel. FIG. 2 is a schematic view illustrating the process of utilizing UV light to irradiate an array substrate and a color filter substrate which are subject to cell assembling during curing sealant, wherein the arrow indicates the irradiation direction of the UV light during curing sealant; the UV light irradiates the array substrate in a direction which is not perpendicular to the array substrate, so as to cure the sealant; the UV light corresponding to sealant passes through the array substrate 1 and irradiates the sealant 2 so as to cure the sealant; and the UV light irradiating areas without the sealant, namely the effective display area 4 and areas between the effective display area 4 and the sealant 2, is shielded by a light shielding layer 3, and hence the UV light will not affect liquid crystals disposed on the areas. Therefore, the display effect and the yield of the display are guaranteed.

The method for manufacturing the display panel, according to the embodiment of the present disclosure, comprises the following steps:

S1: forming a light shielding layer in an area within sealant on the back side of an array substrate before curing sealant.

The area encircled by the sealant comprises an effective display area and areas between the effective display area and the sealant. One side of the array substrate close to the color filter substrate is the front side and one side of the array substrate away from the color filter substrate is the back side. The light shielding layer is usually directly coated on the back side of the array substrate. For instance, the light shielding layer may be made of black positive photoresist, black negative photoresist or an opaque metal material. The light shielding layer is configured to shield the area encircled by the sealant from light during the process of curing sealant, namely when the array substrate provided with the light shielding layer is irradiated, and covers the entire area encircled by the sealant. The light shielding layer is contiguous to the sealant, or the light shielding layer slightly overlaps the sealant.

The light shielding layer has different thicknesses depending on materials of which it is made. If the light shielding layer is made of a black positive photoresist or a black negative photoresist, the thickness of the light shielding layer is approximately 0.5 to 5 μm; and if the light shielding layer is made of a metal material, the thickness of the light shielding layer is 0.2 to 0.4 μm. Optional metal materials comprise molybdenum, aluminum, copper, and etc. No matter which material is adopted to form the light shielding layer, the light shielding layer is used to shield UV light, and the thickness of the light shielding layer may exceed the above range. The factors of the UV light such as the intensity and the irradiation time may be set according to photo initiators used in the sealant. As all the above contents are well known to those skilled in the art, no further description will be given here.

S2: irradiating the array substrate provided with the light shied layer to complete the process of curing sealant.

In the process of curing sealant, UV light is used to irradiate the array substrate provided with the light shielding layer. The UV light irradiates the array substrate in a direction which is not perpendicular to the array substrate, so as to cure the sealant. The UV light at positions corresponding to sealant passes through the array substrate 1 and irradiates the sealant 2 so as to cure the sealant; the UV light irradiating areas not provided with the sealant, namely the effective display area 4 and areas between the effective display area 4 and the sealant 2, is shielded by the light shielding layer 3; and hence the phenomenon that characteristics of liquid crystals are changed as liquid crystal molecules in the effective display area 4 are damaged by the UV light can be effectively avoided, and the liquid crystal molecules in the effective display area 4 are always kept from being irradiated. Therefore, the display effect and the yield of the display panel can be improved.

S3: removing the light shielding layer after curing sealant.

A relevant strippant may be used for stripping the light shielding layer according to materials of which the light shielding layer is made. As the content belongs to the prior art, no further description will be given here.

In the process of manufacturing the display panel, the sealant must be irradiated by the UV light so as to be cured. In the prior art, in the process of curing sealant, the UV light tends to irradiate liquid crystals on the peripheries of the effective display areas of the array substrate, which caused the characteristics of the liquid crystals changed. In the embodiment, the light shielding layer is disposed in the area encircled by the sealant on the back side of the array substrate and replace the mask in the prior art, so that there is no gap between the light shielding layer and the array substrate and the horizontal distance between the light shielding layer and the sealant gets smaller, and hence the phenomenon that characteristics of the liquid crystals in the effective display area are changed due to being irradiated by the UV light can be avoided.

Second Embodiment

The second embodiment will be described below on the basis of the description of the first embodiment.

Figure 3:
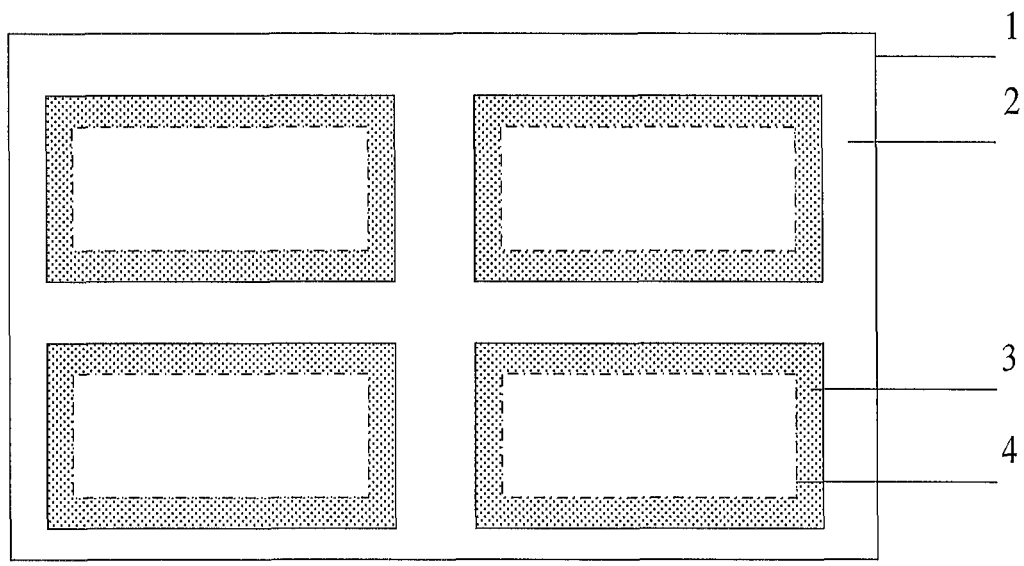
FIG. 3 is a top view of a light shielding layer on the back side of an array substrate provided by the embodiment of the present disclosure.

Furthermore, in the method for manufacturing the display panel, according to the embodiment, as illustrated in FIG. 3, a coverage area of the light shielding layer 3 corresponds to an area between the effective display area 4 and the sealant 2 on the back side of the array substrate 1. As seen from FIG. 3, the light shielding layer 3 cover the areas on the back side of the array substrate 1 between the effective display area 4 and the sealant 2; the UV light irradiating the light shielding layer 3 in the process of curing sealant is shielded by the light shielding layer and cannot pass through the area on the back side of the array substrate 1 between the effective display area 4 and the sealant 2; and hence the display panel can be protected.

Figure 4:
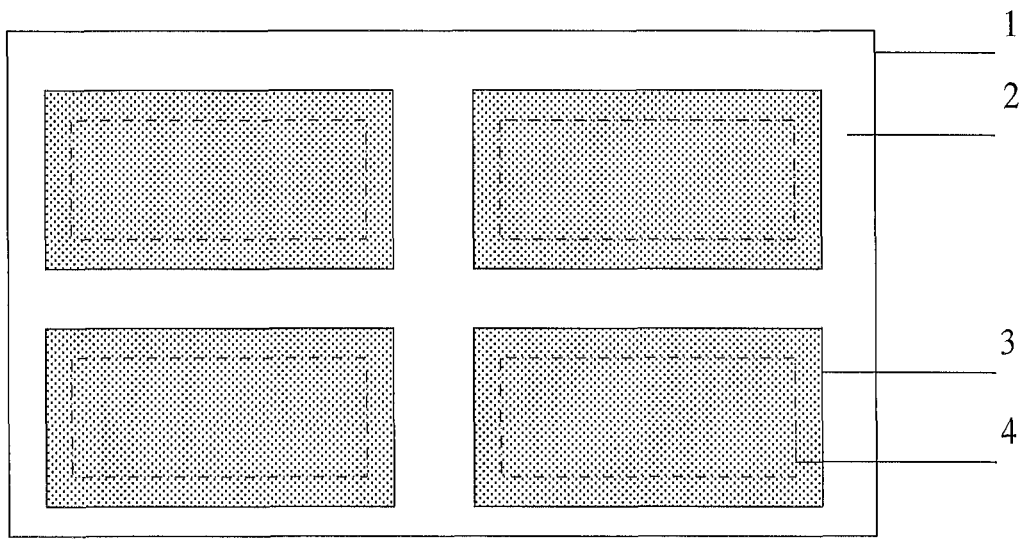
FIG. 4 is a top view of a light shielding layer on the back side of an array substrate provided by the embodiment of the present disclosure.

In the method for manufacturing the display panel, provided by the embodiment of the present disclosure, the coverage area of the light shielding layer 3 may also be, as illustrated in FIG. 4, the entire area encircled by the sealant 2 on the back side of the array substrate 1. The coverage area comprises a first coverage area and a second coverage area; the first coverage area corresponding to the effective display area 4; and the second coverage area corresponding to the area between the effective display area 4 and the sealant 2. As illustrated in FIG. 3, the light shielding layer 3 covers the entire area encircled by the sealant 2 on the back side of the array substrate 1. Compared with the light shielding layer as illustrated in FIG. 3, the light shielding layer further covers area on the back side of the array substrate 1 corresponding to the effective display area 4 so as to shield and protect the entire area on the back side of the array substrate 1 within the sealant 2. Thus, the light shielding layer 3 can protect the display panel better.

As illustrated in FIGS. 3 and 4, the light shielding layer is contiguous to the sealant, or the light shielding layer slightly overlaps the sealant.

Third Embodiment 3

This embodiment will be described below on the basis of the first embodiment.

In the method for manufacturing the display panel, according to the embodiment, the process of forming a light shielding layer comprises the following steps:

step A1: forming a light shielding layer film on the back side of the array substrate; and step A2: forming patterns comprising the light shielding coverage areas by means of a patterning process.

A mask is provided corresponding to the structure of the sealant. The mask is used for performing photolithography to the light shielding layer film on the back side of the entire array substrate to form the patterns comprising the first coverage area and the second coverage area.

Figure 1:
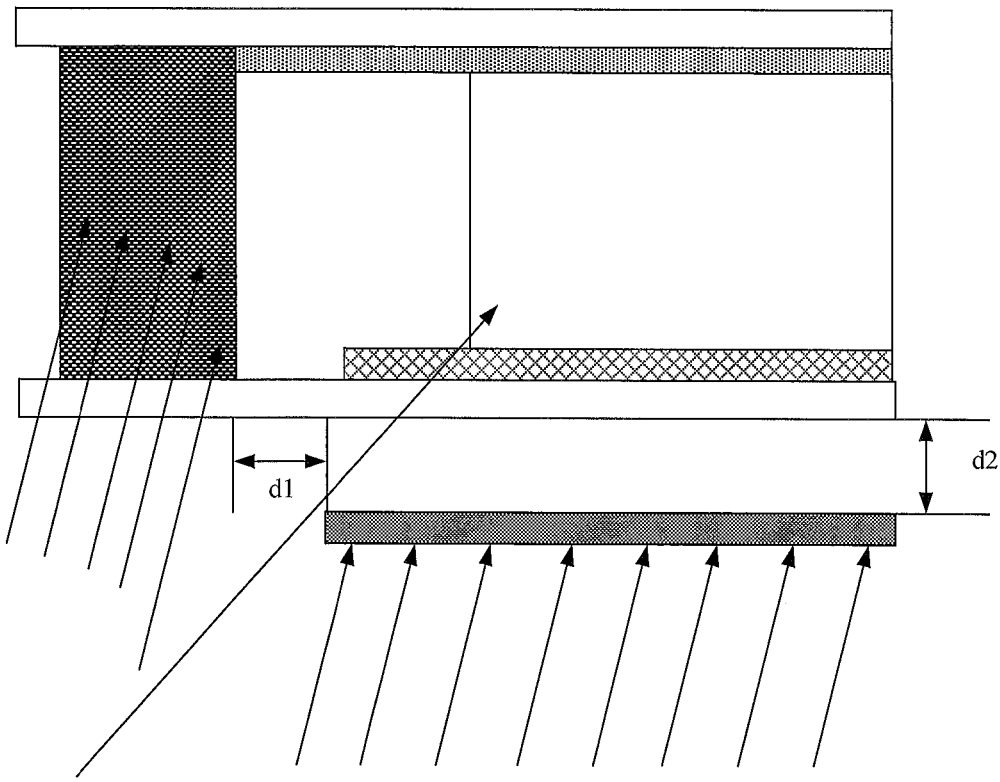
FIG. 1 is a schematic view illustrating curing sealant in an array substrate in the prior art of the present disclosure.

In this embodiment, the light shielding layer is formed before the process of manufacturing the array substrate. At first, the light shielding layer film is formed on the back side of the array substrate; subsequently, the light shielding layer mask is designed according to the pattern of the sealant to be formed and the structure of the effective display area; the light shielding layer is subjected to exposure by photolithography; and hence the light shielding layer can be obtained in the area encircled by the sealant on the back side of the array substrate. By utilizing photolithography, the light shielding layer may be disposed contiguous to the sealant, or the light shielding layer may slightly overlap the sealant. In this manner, the horizontal distance d1 between the mask and the sealant, as illustrated in FIG. 1, can be eliminated. In the process of curing sealant, the phenomenon that liquid crystal materials in the effective display area 4 are affected by the UV light for curing the sealant can be avoided.

Figure 5:
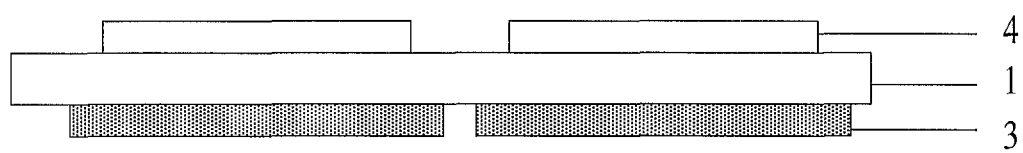
FIG. 5 is a side view of the array substrate after the array substrate provided by the embodiment of the present disclosure is manufactured.

After manufacturing the front side of the array substrate, the side view of the manufactured array substrate is as illustrated in FIG. 5, wherein the light shielding layer 3 completely shields the effective display area 4 and partial area outside the effective display area 4 on the back side of the array substrate 1, so that the UV light for curing the sealant cannot affect liquid crystal materials in the effective display area 4.

In the embodiment, the light shielding layer is formed on the back side of the array substrate by photolithography, so that the alignment accuracy of the light shielding layer is in an order of nanometers. But the alignment accuracy of the mask in the prior art is only 0.1 millimeter. The method according to the present disclosure can greatly improve the alignment accuracy and reduce the horizontal distance between the light shielding layer and the sealant, and hence effectively protect the liquid crystals in the effective display area, improve the display effect and the yield of the display panel, and facilitate manufacturing narrow-frame display devices.

The foregoing are merely exemplary embodiments of the invention, but are not used to limit the protection scope of the invention. The protection scope of the invention shall be defined by the attached claims.

The invention claimed is:

1. A method for manufacturing a display panel, the display panel comprising an array substrate and a color filter substrate adhered to each other by means of cell assembling, liquid crystals filled between the array substrate and the color filter substrate adhered to each other by a sealant, the method comprising:

coating the sealant along peripheries of a side of one substrate of the array substrate and the color filter substrate, the side being opposite to the other substrate;

forming a light shielding layer in an area encircled by the sealant on a side of the array substrate away from the color filter substrate, the light shielding layer attached to the array substrate in a manner of light shielding film wherein the light shielding layer is directly coated on the back side of the array substrate and wherein the light shielding layer is configured to shield the area encircled by the sealant from the light;

irradiating the array substrate provided with the light shielding layer and curing the sealant; and removing the light shielding layer.

2. The method according to claim 1, wherein the light shielding layer is configured to shield an area encircled by the sealant in the process of irradiating the array substrate from light.

3. The method according to claim 1, wherein UV light is adopted to cure the sealant.

4. The method according to claim 1, wherein a coverage area of the light shielding layer comprises a first coverage area and a second coverage area; the first coverage area corresponds to an effective display area of the display panel; and the second coverage area corresponds to an area between the effective display area and the sealant.

5. The method according to claim 1, wherein a coverage area of the light shielding layer corresponds to an area on the back side of the array substrate between an effective display area and the sealant.

6. The method according to claim 1, wherein the light shielding layer is made of black positive photoresist, black negative photoresist or an opaque metal material.

7. The method according to claim 1, wherein forming the light shielding layer includes:

forming a light shielding film on the back side of the array substrate; and forming patterns of the light shielding layer by patterning process.

8. The method according to claim 1, wherein the light shielding layer is disposed contiguous to the sealant, or the light shielding layer overlaps the sealant.

9. The method according to claim 2, wherein UV light is adopted to cure the sealant.

10. The method according to claim 2, wherein a coverage area of the light shielding layer comprises a first coverage area and a second coverage area; the first coverage area corresponds to an effective display area of the display panel; and the second coverage area corresponds to an area between the effective display area and the sealant.

11. The method according to claim 3, wherein a coverage area of the light shielding layer comprises a first coverage area and a second coverage area; the first coverage area corresponds to an effective display area of the display panel; and the second coverage area corresponds to an area between the effective display area and the sealant.

12. The method according to claim 2, wherein a coverage area of the light shielding layer corresponds to an area on the back side of the array substrate between an effective display area and the sealant.

13. The method according to claim 3, wherein a coverage area of the light shielding layer corresponds to an area on the back side of the array substrate between an effective display area and the sealant.

14. The method according to claim 2, wherein the light shielding layer is made of black positive photoresist, black negative photoresist or an opaque metal material.

15. The method according to claim 3, wherein the light shielding layer is made of black positive photoresist, black negative photoresist or an opaque metal material.

16. The method according to claim 4, wherein the light shielding layer is made of black positive photoresist, black negative photoresist or an opaque metal material.

17. The method according to claim 2, wherein forming the light shielding layer includes:

forming a light shielding film on the back side of the array substrate; and forming patterns of the light shielding layer by patterning process.

18. The method according to claim 3, wherein forming the light shielding layer includes:

forming a light shielding film on the back side of the array substrate; and forming patterns of the light shielding layer by patterning process.

19. The method according to claim 2, wherein the light shielding layer is disposed contiguous to the sealant, or the light shielding layer overlaps the sealant.

20. The method according to claim 3, wherein the light shielding layer is disposed contiguous to the sealant, or the light shielding layer overlaps the sealant.

* * * * *